(12) United States Patent
McCombs et al.

(10) Patent No.: US 8,185,784 B2
(45) Date of Patent: May 22, 2012

(54) DRIVE HEALTH MONITORING WITH PROVISIONS FOR DRIVE PROBATION STATE AND DRIVE COPY REBUILD

(75) Inventors: Craig C. McCombs, Bel Aire, KS (US);
Naman Nair, Fremont, CA (US);
Martin Jess, Erie, CO (US); Jeremy Birzer, Wichita, KS (US)

(73) Assignee: LSI Corporation, Milpitas, CA (US)

( * ) Notice: Subject to any disclaimer, the term of this patent is extended or adjusted under 35 U.S.C. 154(b) by 616 days.

(21) Appl. No.: 12/150,426

(22) Filed: Apr. 28, 2008

(65) Prior Publication Data
US 2009/0271657 A1     Oct. 29, 2009

(51) Int. Cl.
*G06F 11/00*     (2006.01)
(52) U.S. Cl. .................. 714/47.2; 714/6.23; 714/6.24
(58) Field of Classification Search .................. 714/6, 7, 714/47, 6.22–6.24, 47.1–47.3
See application file for complete search history.

(56) References Cited

U.S. PATENT DOCUMENTS

| | | | | |
|---|---|---|---|---|
| 5,761,411 A * | 6/1998 | Teague et al. | | 714/47 |
| 6,401,214 B1 * | 6/2002 | Li | | 714/6 |
| 6,671,774 B1 * | 12/2003 | Lam et al. | | 711/112 |
| 6,697,976 B1 * | 2/2004 | Satoh et al. | | 714/704 |
| 7,313,721 B2 * | 12/2007 | Ashmore | | 714/7 |
| 7,337,353 B2 * | 2/2008 | Yamamoto et al. | | 714/7 |
| 7,369,339 B2 * | 5/2008 | Kojima et al. | | 360/31 |
| 7,373,559 B2 * | 5/2008 | Guha | | 714/54 |
| 7,434,097 B2 * | 10/2008 | Guha et al. | | 714/7 |
| 7,565,573 B2 * | 7/2009 | Tanaka | | 714/6.32 |
| 7,574,623 B1 * | 8/2009 | Goel et al. | | 714/47.2 |
| 7,734,957 B2 * | 6/2010 | Nakamura et al. | | 714/25 |
| 7,809,990 B2 * | 10/2010 | Sasaki | | 714/42 |
| 2002/0013915 A1 * | 1/2002 | Migita et al. | | 714/6 |
| 2005/0060618 A1 * | 3/2005 | Guha | | 714/54 |
| 2005/0114728 A1 * | 5/2005 | Aizawa et al. | | 714/6 |
| 2005/0283655 A1 * | 12/2005 | Ashmore | | 714/7 |
| 2006/0034008 A1 * | 2/2006 | Kojima et al. | | 360/53 |
| 2007/0174720 A1 * | 7/2007 | Kubo et al. | | 714/42 |
| 2007/0277059 A1 * | 11/2007 | Ogawa | | 714/54 |
| 2008/0010557 A1 * | 1/2008 | Kume | | 714/47 |
| 2008/0120516 A1 * | 5/2008 | Thor | | 714/2 |

* cited by examiner

*Primary Examiner* — Robert Beausoliel, Jr.
*Assistant Examiner* — Elmira Mehrmanesh
(74) *Attorney, Agent, or Firm* — Suiter Swantz pc llo

(57) ABSTRACT

The present disclosure is directed to a system and method for monitoring drive health.

A method for monitoring drive health may comprise: a) conducting a predictive fault analysis for at least one drive of a RAID; and b) copying data from the at least one drive of the RAID to a replacement drive according to the predictive fault analysis.

A system for monitoring drive health may comprise: a) means for conducting a predictive fault analysis for at least one drive of a RAID; and b) means for copying data from the at least one drive of the RAID to a replacement drive according to the predictive fault analysis.

21 Claims, 8 Drawing Sheets

DRIVE HEALTH MONITORING WITH PROVISIONS FOR DRIVE PROBATION STATE AND DRIVE COPY REBUILD

BACKGROUND

Array controllers employ mechanisms for recovering from drive media exceptions by utilizing the data redundancy inherent in most types of redundant array of independent disk (RAID) storage configurations. However an array controller's ability to recover from such drive exceptions may result in the development of drive reliability problems on one or more drives in a RAID group over an extended period of time. Also the potential for data corruption may increase as drive reliability problems develop on any of the drives in a RAID group. As such, by the time a first drive is failed by the array controller, the remaining drives in the RAID group may also develop reliability problems that the array controller can no longer recover from following a loss of redundant data. Such a scenario often results in the loss of data availability because of a failure of a second drive during the rebuild process for the first failed drive.

The potential for this loss of data availability may be even greater when larger or less expensive drives are used in a RAID group. Even when a sufficient number of reliable drives remain to rebuild data on a failed drive or drives, the rebuild process may be time consuming requiring special hardware and complex reconstruction software procedures. The time it takes to completely rebuild the data from a first drive on a replacement drive increases the potential for a subsequent drive failure on a second drive that will result in a loss of data availability. There may also be a potential for the replacement drive for the first drive to fail during the rebuild process further threatening data availability by expanding the window of opportunity for second drive failure.

One method for handling drive degradation may be for the array controller to wait until a drive Self-Monitoring, Analysis and Reporting Technology (SMART) feature detects an unreliable drive or wait until the drive may be completely unable (e.g. having exhausted the array controller's retry and recovery procedures) to complete a requested operation. The Self-Monitoring, Analysis and Reporting Technology (SMART) is an internal drive technology used by most modern drives that monitors drive operating metrics and exceptions in order to predict when a drive may be unreliable. Some drive types actively report SMART errors while with other drive types require polling of drive conditions for by an external process.

However, SMART may be inadequate at detecting drives with developing reliability problems. For example, thresholds may not be based drive rates, drives may not count all exceptions (e.g. those reported back to the device that initiated the command), drive types may not report errors from which the drive was able to recover and, for some drive types, degraded conditions must be polled for by an external process. An array controller may fail a drive because a required IO command could not be completed or because the drive may be exhibiting degraded performance but at no time does the drive report a SMART error.

Another mechanism for handling decaying drive quality may be for array controllers to perform a background drive media scan that corrects detected drive media errors encountered on the drive media. However, the media scan may be incapable of keeping up with the creation of new media errors. The external analysis of array and drive exception logs cannot provide rapid detection of an unreliable drive because of the inherent delay of the polling cycle and overhead of the error log analysis. The technique can also impact performance and increase total storage cost especially if the function may be performed by a separate service processor.

Another option may be the use of one of the servers or a separate service processor to periodically scan array error logs for a controller and/or drive to detect developing drive reliability problems. Such a method requires issuing in-band or out-of-band commands to all the array controllers and to every drive in the storage system. However, the external analysis of array and drive exception logs cannot provide rapid detection of an unreliable drive because of the inherent delay of the polling cycle and overhead of the error log analysis. The technique can also impact performance and increase total storage cost especially if the function may be performed by a separate service processor.

Another option may be the use of a RAID configuration providing additional data redundancy, such as RAID-6, so the RAID group can withstand more than one drive failure without the loss of data availability. Use of a fewer number of drives in each RAID group reduces the potential for multiple drive failures and subsequent loss of data availability. Drive reliability can be enhanced by limiting the drive input/output (IO) workload generated by an array controller and by utilizing a large array controller data cache in order to reduce the IO workload on each individual drive in the storage system. However, use of a RAID configuration with additional data redundancy, such as RAID-6, impacts performance and requires additional drives which increases total storage cost. Conversely, restricting the number of drives in a RAID group, as a means to improve reliability, increases total storage cost while storage market requirements push for larger number of drives in a RAID group in order to reduce cost.

Other alternatives that limit the drive IO workload or use more reliable drives increase total storage cost. Some ways to reduce the drive IO workload may be using a larger array controller cache or artificially limiting the array performance. However, these mechanisms may increases storage cost or the time to rebuild a failed drive on the replacement drive increases.

SUMMARY

The present disclosure is directed to a system and method for monitoring drive health. A method for monitoring drive health may comprise: a) conducting a predictive fault analysis for at least one drive of a RAID; and b) copying data from the at least one drive of the RAID to a replacement drive according to the predictive fault analysis.

A system for monitoring drive health may comprise: a) means for conducting a predictive fault analysis for at least one drive of a RAID; and b) means for copying data from the at least one drive of the RAID to a replacement drive according to the predictive fault analysis.

It is to be understood that both the foregoing general description and the following detailed description are exemplary and explanatory only and are not necessarily restrictive of the claims. The accompanying drawings, which are incorporated in and constitute a part of the specification, illustrate examples and together with the general description, serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Figure 1:
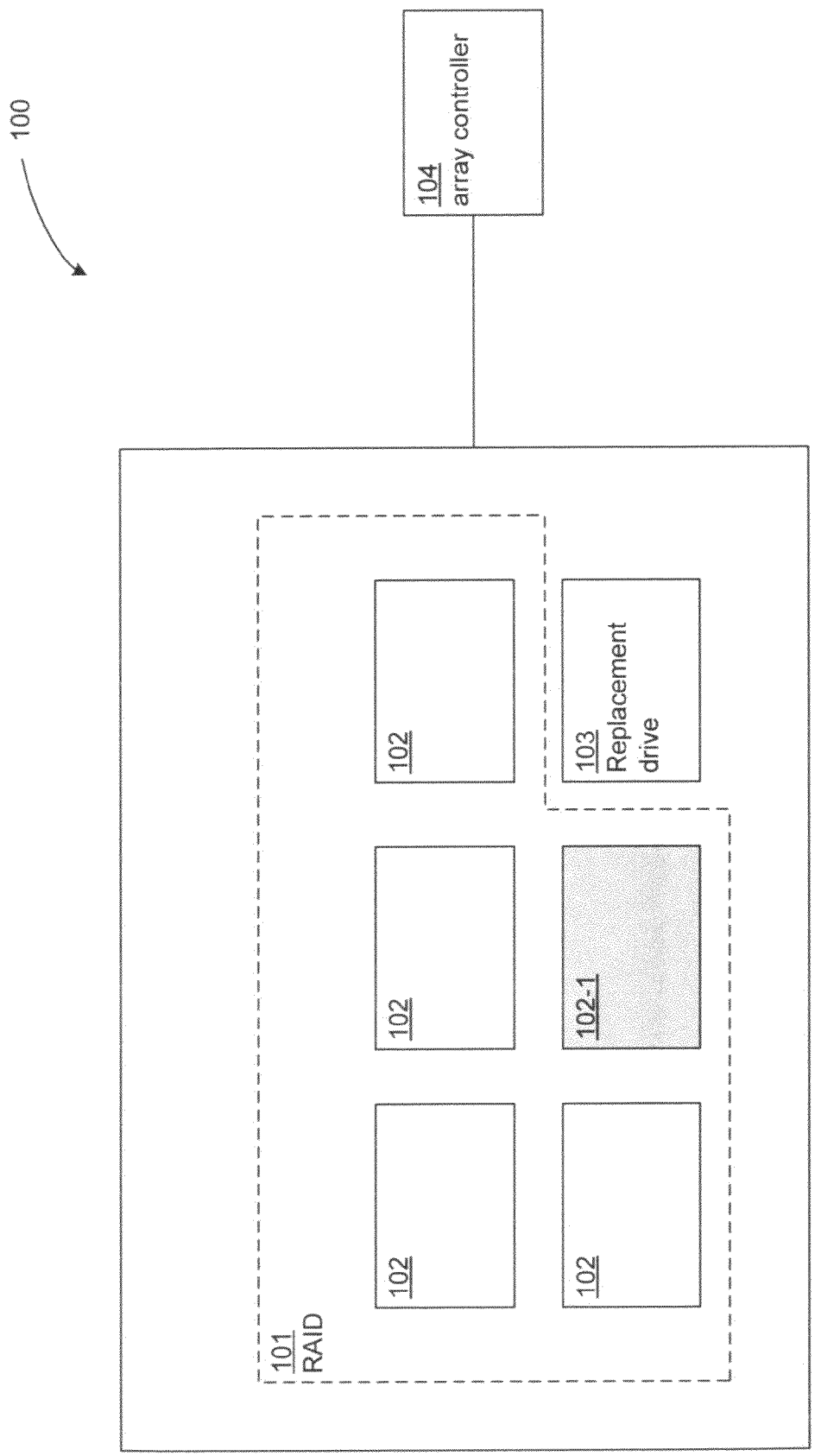
FIG. 1 shows a high-level block system for monitoring drive health.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1 illustrates an example system 100 in which one or more technologies may be implemented. The system 100 may comprise a redundant array of independent drives (RAID) 101 including drives 102, a non-RAID replacement drive 103, and an array controller 104.

Figure 2:
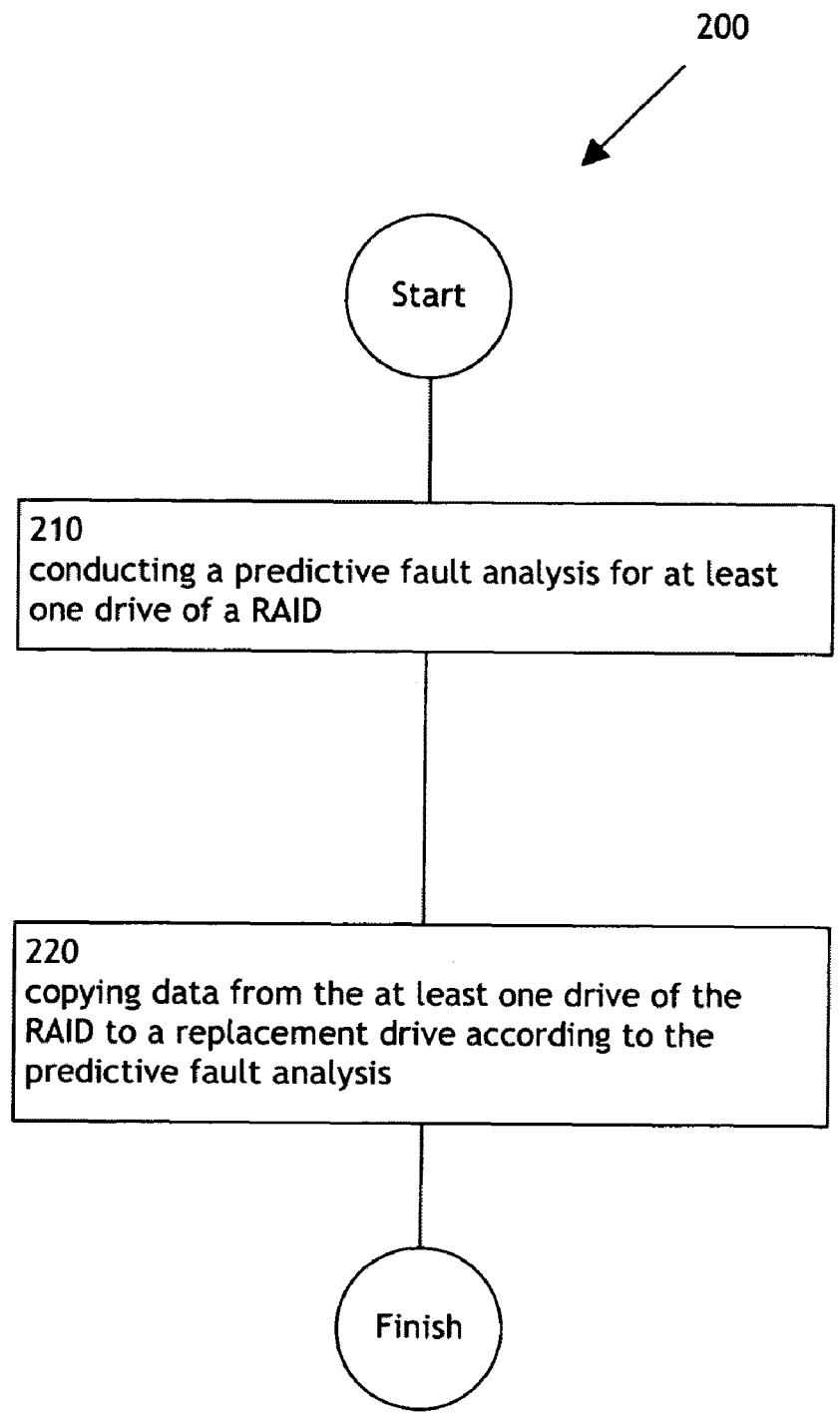
FIG. 2 shows a high-level logic flowchart of a process for monitoring drive health.

FIG. 2 illustrates an operational flow 200 representing example operations related to drive health monitoring. In FIG. 2 and in following figures that include various examples of operational flows, discussion and explanation may be provided with respect to the above-described examples of FIG. 1, and/or with respect to other examples and contexts. However, it should be understood that the operational flows may be executed in a number of other environments and contexts, and/or in modified versions of FIG. 1. Also, although the various operational flows are presented in the sequence(s) illustrated, it should be understood that the various operations may be performed in other orders than those which are illustrated, or may be performed concurrently.

After a start operation, the operational flow 200 moves to an operation 210. Operation 210 depicts conducting a predictive fault analysis for at least one drive of a RAID. For example, as shown in FIG. 1, the array controller 104 may be configured to monitor reported drive exceptions and simple drive operating metrics in order to detect a degraded drive 102-1 with developing reliability problems. Such reports may include monitoring errors reported by the drive as well as monitoring exceptions and operating metrics that only the array controller can detect. Detection of a degraded drive 102-1 by the array controller 104 may be sometimes referred to as a synthesized drive predictive fault analysis (PFA).

Examples of drive-reported errors may include recovered, unrecoverable, firmware and hardware errors. Drive errors indicating automatic block reallocation may be treated as more serious exceptions than those completed through recovery or retries as they may indicate an increase in the number of drive media defects.

Then, operation 220 depicts copying data from the at least one drive of the RAID to a replacement drive according to the predictive fault analysis. For example, as shown in FIG. 1, the array controller 104 may initiate the copying of data from degraded drive 102-1 to a replacement drive 103 upon the detection of a threshold level of degradation as discussed below. Once a copy-rebuild or RAID reconstruction is complete, the array controller 104 may perform diagnostics and data integrity tests on the degraded drive 102-1. Such diagnostics may provide additional information about drive reliability problem beneficial to improving drive quality. In some cases the degraded drive 102-1 may become too unreliable to complete diagnostics. Future drives equipped with advanced recertification test and verification features may, in some cases, allow the drive to be placed back into service.

Figure 3:
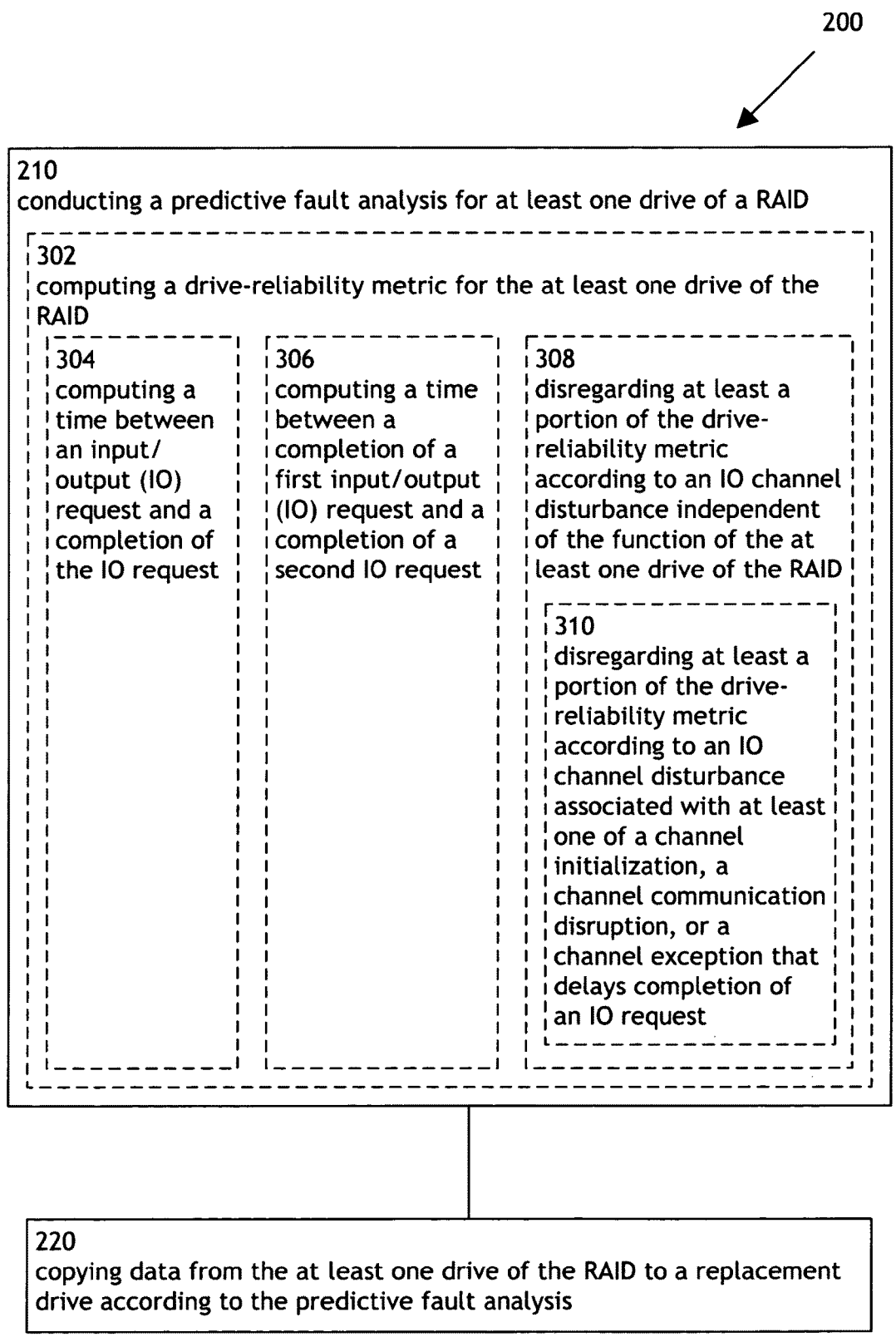
FIG. 3 shows a high-level logic flowchart of a process depicting alternate implementations of FIG. 2.

FIG. 3 illustrates alternative embodiments of the example operational flow 200 of FIG. 2. FIG. 3 illustrates example embodiments where the operation 210 may include at least one additional operation. Additional operations may include an operation 302, an operation 304, an operation 306, an operation 308, and/or an operation 310.

The operation 302 illustrates computing a drive-reliability metric for the at least one drive of the RAID. For example, as shown in FIG. 1, the array controller 104 may receive operational data from RAID 101 regarding performance of the respective drives 102.

Further, the operation 304 illustrates computing a time between an input/output (IO) request and a completion of the IO request. For example, as shown in FIG. 1, the array controller 104 may receive data regarding the timing of an IO request addressed to a drive 102 and the timing of the completion of that IO request so as to compute the time interval required to complete the IO request.

Further, the operation 306 illustrates computing a time between a completion of a first input/output (IO) request and a completion of a second IO request. For example, as shown in FIG. 1, the array controller 104 may receive data regarding the timing of the completion of a first IO request addressed to a drive 102 and the timing of the completion of a second IO request addressed to that same drive so as to compute the time interval required to complete sequentially queued drive IO requests.

Further, the operation 308 illustrates disregarding at least a portion of the drive-reliability metric according to an IO channel disturbance independent of the function of the at least one drive of the RAID. For example, as shown in FIG. 1, the array controller 104 may disregard delayed IO response times if one or more drive IO completions are delayed by an IO channel disturbance independent of drive 102 function.

Further, the operation 310 illustrates disregarding at least a portion of the drive-reliability metric according to an IO channel disturbance associated with at least one of a channel initialization, a channel communication disruption, or a channel exception that delays completion of an IO request. For example, as shown in FIG. 1, the array controller 104 may disregard delayed IO response times if one or more drive IO completions are delayed by an IO channel disturbance independent of drive 102 function. Specifically, a delayed IO response may be discounted if results from an IO channel disruption, such as channel initialization, channel communication disruption or a channel exception that significantly delays the normal completion of a pending drive IO command.

As such, drive channel errors (e.g. drive IO timeouts, IO protocol errors) may be monitored and managed by a separate function as these exceptions may result from problems independent of the drives (e.g. other devices connected to the IO channel). However, a delayed IO response time may be properly counted when a drive IO timeout may be detected on both redundant ports of a single degraded drive 102-1 when no other drives 102 on the same two redundant IO channels may be reporting drive IO timeouts. In this specific case, the degraded drive 102-1 may be the most likely cause.

Further, the array controller 104 may filter specific drive exception or error code combinations from consideration if they may be expected during normal operation.

Figure 4:
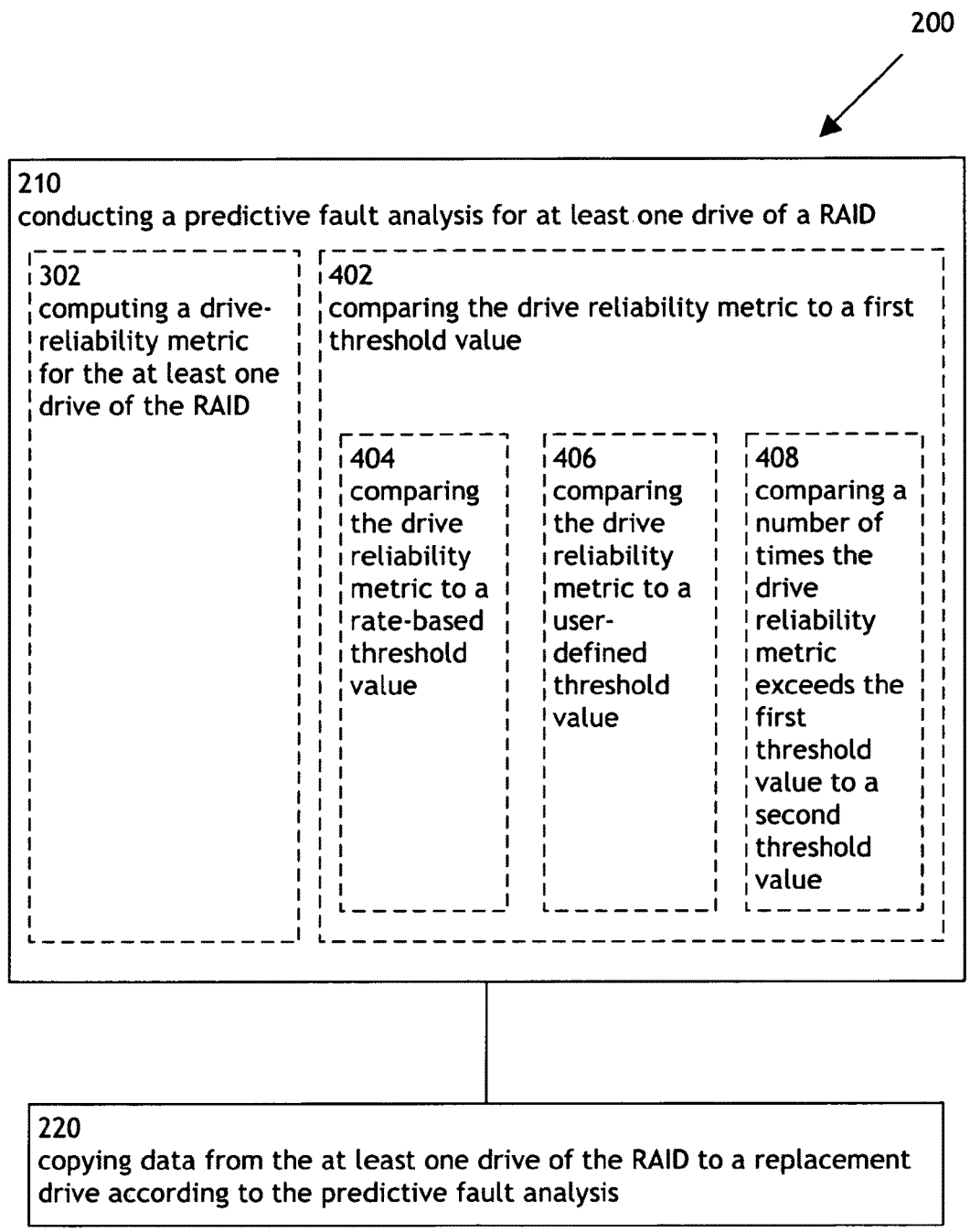
FIG. 4 shows a high-level logic flowchart of a process depicting alternate implementations of FIG. 2.

FIG. 4 illustrates alternative embodiments of the example operational flow 200 of FIG. 2. FIG. 4 illustrates example embodiments where the operation 210 may include at least one additional operation. Additional operations may include an operation 402, an operation 404, an operation 406, and/or an operation 408.

Further, the operation 402 illustrates comparing the drive reliability metric to a first threshold value. For example, as shown in FIG. 1, the array controller 104 may receive data regarding a reliability metric for a degraded drive 102-1 which may be compared to a threshold value for that reliability metric.

Further, the operation 404 illustrates comparing the drive reliability metric to a rate-based threshold value. For example, as shown in FIG. 1, the array controller 104 may receive data regarding a rate-based reliability metric for a degraded drive 102-1 which may be compared to a threshold value for that rate-based reliability metric.

Rate based thresholds may define a specified number of exceptions in a specified amount of time, ensuring that normal or expected levels of drive exceptions do not trigger inappropriate array controller 104 action. Typically, rate thresholds may be greater than one occurrence per given time period to prohibit being triggered by a single or occasional exception. For example, a drive reported recovered error threshold might be set to 50 reported errors in a 24-hour period. The array controller may only count a single exception encountered during the execution of the same IO request thereby avoiding duplication of the exception count due to subsequent and related exceptions encountered during recovery and retry operations for the same IO request. An example of a drive IO response time threshold may be 30 drive completions with a completion time greater than 1 second that all occur in a 1-hour period. Different sets of thresholds may be used for different types of drives. Threshold values may be governed by drive specifications, but typically more expensive enterprise drives may require more stringent thresholds than near-line or desktop drives.

Further, the operation 406 illustrates comparing a number of times the drive reliability metric exceeds the first threshold value to a second threshold value. For example, as shown in FIG. 1, the array controller 104 may receive data regarding a reliability metric for a degraded drive 102-1 which may be compared to a threshold value for that rate-based reliability metric. A second threshold level may be used to dictate the number of times the first level threshold may be exceeded before a particular action may be taken. For example, a second level threshold of 4 may indicate that a first level threshold of a given number of IO recovered errors in a one-hour time frame be exceeded 4 times before the array controller takes action.

Each threshold may have a separate and independent parameter specifying an array controller 104 action and the action may be governed by the severity of the exception or condition. For example, a parameter may specify that, for a specific threshold, the array controller 104 may place the degraded drive 102-1 on probation and initiate a preventative copy/rebuild of the degraded drive 102-1 to the replacement drive 103 when the specified threshold is exceeded. Similarly, the same control parameter may cause the array controller 104 to fail the degraded drive 102-1 and initiate a full RAID reconstruction procedure when a different threshold is exceeded.

When a read error (e.g., unrecoverable media error) is encountered on the degraded drive 102-1 during the copy-rebuild of data from the degraded drive 102-1 to the replacement drive 103, exception retries or recovery attempts may not be attempted for the degraded drive 102-1. Instead a localized reconstruction of the requested data of the degraded drive 102-1 may be employed and then the process may return to the copy-rebuild operation.

In both instances, an appropriate notification may be issued to the user alerting them to the drive condition and action taken. Analysis of other available information may be used to verify a drive problem and this information may be included with the alert notification or stored for future reference (e.g. later drive failure analysis by drive vendor).

Different sets of rate based thresholds may be used to trigger actions taken by the array controller 104. Automated controller actions may include collection and analysis of drive problems using collaborating information to verify the problem, issuing alerts and notifications to user, initiating a preemptive drive copy rebuild operation and, when necessary, failing the drive and initiating a drive reconstruction procedure.

Further, the operation 408 illustrates comparing the drive reliability metric to a user-defined threshold value. For example, as shown in FIG. 1, a, user may elect to have the array controller 104 place a degraded drive 102-1 in a probation state if a given rate of recovered errors is exceeded, but fail the degraded drive 102-1 if a given rate of hardware errors is exceeded.

At least one staged replacement drive 103, or hot spares, may also be utilized. The array controller 104 may perform periodic read and write diagnostics on the replacement drive 103. Use of RAID configurations with multiple levels of redundancy, such as RAID-6, improves the reliability and performance of copy-rebuild or reconstruction operations because it promotes rapid restoration of a degraded drive 102-1 to optimal operation and reduces the window of opportunity for another drive 102 failure during either of those processes.

Verification of the synthesized drive PFA by the array controller 104 may include analysis of other statistics maintained by the array controller 104 for a given drive. For example, an array controller 104 may collect and analyze internal drive statistics and logs for a particular drive and compare that data to collected statistics and parametric indicators of other drives in the same RAID group or same drive enclosure.

Figure 5:
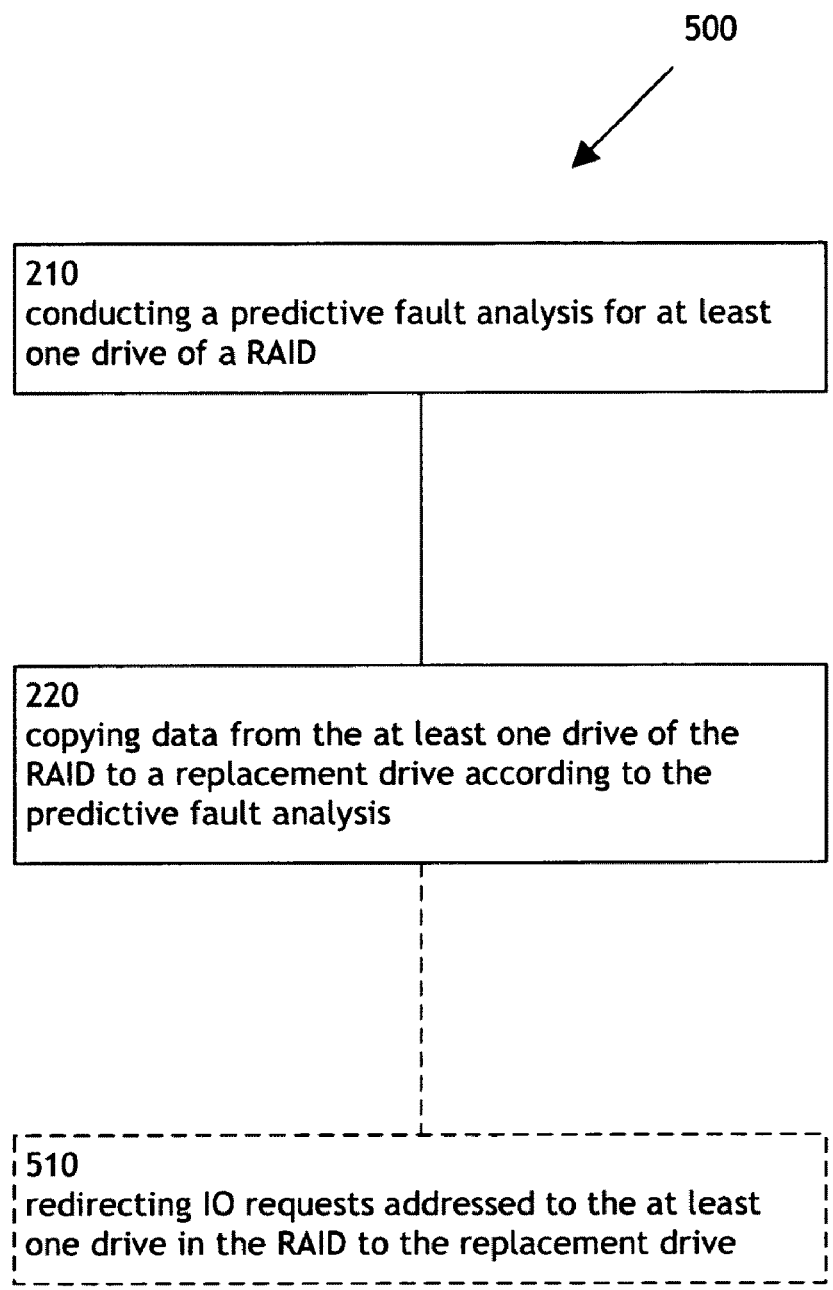
FIG. 5 shows a high-level logic flowchart of a process depicting alternate implementations of FIG. 2.

FIG. 5 illustrates an operational flow 500 representing example operations related to drive health monitoring. FIG. 5 illustrates an example embodiment where the example operational flow 200 of FIG. 2 may include at least one additional operation. Additional operations may include an operation 510.

After a start operation, an operation 210, and an operation 220, the operational flow 500 moves to an operation 510. Operation 510 illustrates redirecting IO requests addressed to the at least one drive in the RAID to the replacement drive. For example, as shown in FIG. 1, the array controller 104 may redirect IO requests addressed to the degraded drive 102-1 to a portion of the replacement drive 103 which contains data copied from the degraded drive 102-1 according to the predictive fault analysis.

Redirecting the IO directed to the degraded drive to the replacement drive may reduce the workload on the degraded drive so the copy-rebuild can complete more rapidly and prevent the degraded drive from being failed.

Figure 6:
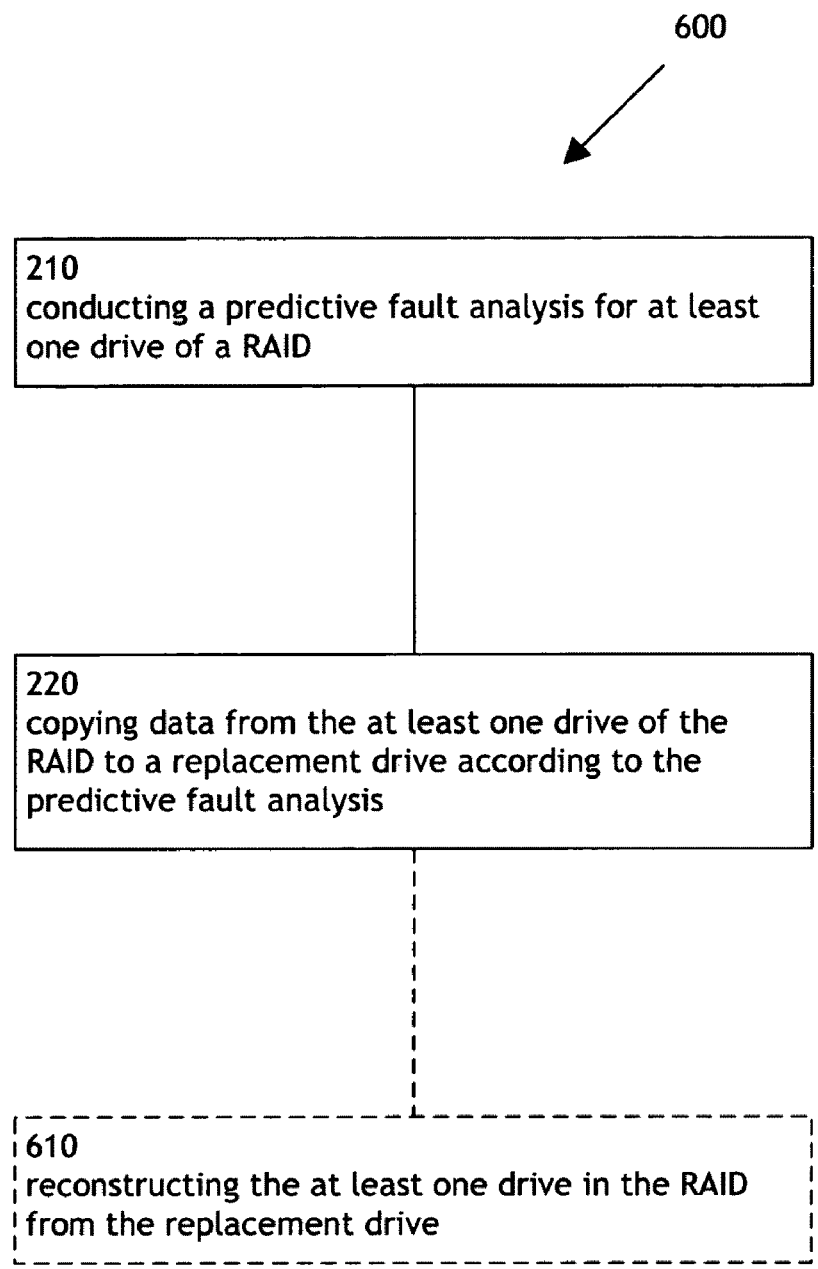
FIG. 6 shows a high-level logic flowchart of a process depicting alternate implementations of FIG. 2.

FIG. 6 illustrates an operational flow 600 representing example operations related to drive health monitoring. FIG. 6 illustrates an example embodiment where the example operational flow 200 of FIG. 2 may include at least one additional operation. Additional operations may include an operation 610.

After a start operation, an operation 210, and an operation 220, the operational flow 600 moves to an operation 610. Operation 610 illustrates reconstructing data of the at least one drive in the RAID from the replacement drive. For example, as shown in FIG. 1, the array controller 104 may initiate a reconstruction of data previously copied from degraded drive 102-1 to the replacement drive 103 back to at least one of the RAID drives 102. This reconstruction may be conducted without retries when a media error occurs on a read IO request to the degraded drive 102-1. Alternately, the addressed block may be marked as unusable when a media error occurs on a write IO request to the degraded drive 102-1.

Figure 7:
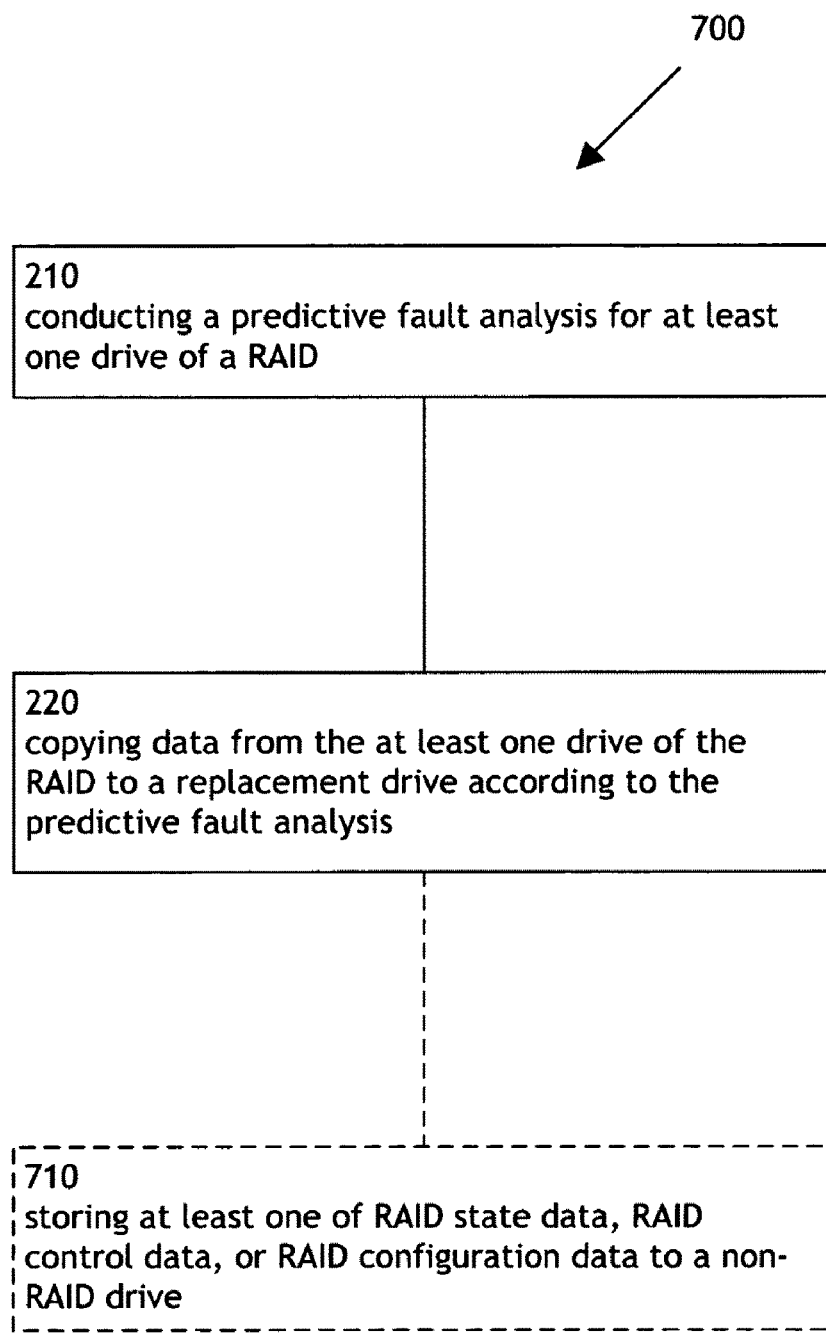
FIG. 7 shows a high-level logic flowchart of a process depicting alternate implementations of FIG. 2.

FIG. 7 illustrates an operational flow 700 representing example operations related to monitoring drive health. FIG. 7 illustrates an example embodiment where the example operational flow 200 of FIG. 2 may include at least one additional operation. Additional operations may include an operation 710.

After a start operation, an operation 210, and an operation 220, the operational flow 700 moves to an operation 710. Operation 710 illustrates storing at least one of RAID state data, RAID control data, or RAID configuration data to a non-RAID drive or other auxiliary diagnostic data storage facility such as a USB drive. For example, as shown in FIG. 1, the array controller 104 may store critical RAID state, control and configuration information to another drive in the event that the degraded drive 102-1 must be failed so as to provide data for subsequent drive failure analysis.

Figure 8:
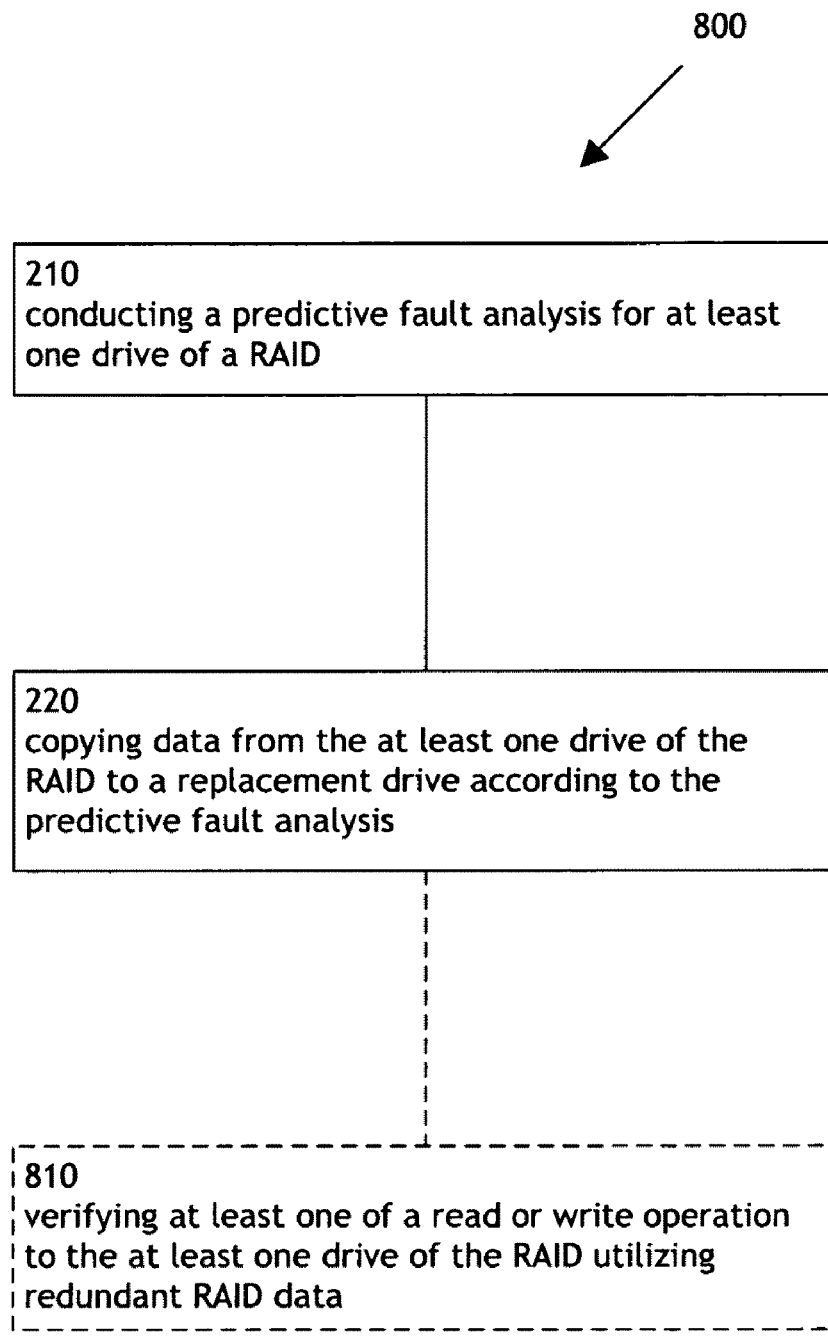
FIG. 8 shows a high-level logic flowchart of a process depicting alternate implementations of FIG. 2.

FIG. 8 illustrates an operational flow 800 representing example operations related to monitoring drive health. FIG. 8 illustrates an example embodiment where the example operational flow 200 of FIG. 2 may include at least one additional operation. Additional operations may include an operation 810.

After a start operation, an operation 210, and an operation 220, the operational flow 800 moves to an operation 810. Operation 810 illustrates verifying at least one of a read or write operation to the at least one drive of the RAID utilizing redundant RAID data. For example, as shown in FIG. 1, the array controller 104 may recertify the degraded drive 102-1 by comparing the results of a write IO operation addressed to degraded drive 102-1 to the results of a read IO operation to the same addressed portion of the degraded drive 102-1 to ensure proper operation of the degraded drive 102-1. If the write and read IO operations correspond, the degraded drive 102-1 may be returned to full service as a recertified drive 102.

It should be noted that use of RAID-6 may improve copy-rebuild success of a degraded drive 102-1 due to additional levels of data redundancy which may allow an array controller 104 to recover from media errors encountered on any of the drives 102 in the RAID 101 group. If a degraded drive 102-1 fails during a copy-rebuild process, the RAID data reconstruction process may begin where the copy-rebuild left off.

Further, continuous monitoring for the presence of a degraded drive 102-1 may reduce the possibility of multiple drives within a RAID 101 group developing problems that can jeopardize data availability if a subsequent drive failure occurs during a copy back or reconstruction process. A default action may be established were an array controller will prohibit the failing of a drive on a synthesized drive PFA if doing so will result in loss of data available. The array controller 104 may issue an alert notification to the user when a synthesized drive PFA may be detected. Like the synthesized drive PFA, provisions for the user to specify what array controller action may be taken when a drive does report a SMART predictive fault analysis (PFA) may be available.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The invention claimed is:

1. A system comprising:
    means for conducting a predictive fault analysis for at least one drive of a redundant array of independent drives (RAID), wherein the means for conducting a predictive fault analysis for at least one drive of a redundant array of independent drives (RAID) comprises:
        means for computing a drive-reliability metric for the at least one drive of the RAID, wherein the means for computing a drive-reliability metric for the at least one drive of the RAID comprises:
            means for disregarding at least a portion of the drive-reliability metric according to an IO channel disturbance independent of the function of the at least one drive of the RAID; and
    means for copying data from the at least one drive of the RAID to a replacement drive when the number of times the drive reliability metric passes the first threshold value passes a second threshold value.

2. The system of claim 1, wherein the means for computing a drive-reliability metric for the at least one drive of the RAID comprises:
    means for computing a time between an input/output (IO) request and a completion of the IO request.

3. The system of claim 1, wherein the means for computing a drive-reliability metric for the at least one drive of the RAID comprises:
    means for computing a time between a completion of a first input/output (IO) request and a completion of a second IO request.

4. The system of claim 1, wherein the means for computing a drive-reliability metric for the at least one drive of the RAID comprises:
    means for comparing the drive reliability metric to a rate-based threshold value.

5. The system of claim 1, wherein the means for computing a drive-reliability metric for the at least one drive of the RAID comprises:
    means for comparing the drive reliability metric to a user-defined threshold value.

6. The system of claim 1, wherein the means for disregarding at least a portion of the drive-reliability metric according to an IO channel disturbance independent of the function of the at least one drive of the RAID comprises:
    means for disregarding at least a portion of the drive-reliability metric according to an IO channel disturbance associated with at least one of a channel initialization, a channel communication disruption, or a channel exception that delays completion of an IO request.

7. The system of claim 1, further comprising:
    means for redirecting IO requests addressed to the at least one drive in the RAID to the replacement drive.

8. The system of claim 1, further comprising:
    means for reconstructing data of the at least one drive in the RAID from the replacement drive.

9. The system of claim 1, further comprising:
    means for storing at least one of RAID state data, RAID control data, or RAID configuration data to a non-RAID drive.

10. The system of claim 1, further comprising:
    means for verifying at least one of a read or write operation to the at least one drive of the RAID utilizing redundant RAID data.

11. A computer-readable medium comprising computer readable instructions for execution on a processor which, when executed on a processor, cause a computing device to execute a process, the process comprising:
    conducting a predictive fault analysis for at least one drive of a redundant array of independent drives (RAID), wherein the conducting a predictive fault analysis for at least one drive of a redundant array of independent drives (RAID) comprises:
        computing a drive-reliability metric for the at least one drive of the RAID, wherein the computing a drive-reliability metric for the at least one drive of the RAID comprises:
            means for disregarding at least a portion of the drive-reliability metric according to an IO channel disturbance independent of the function of the at least one drive of the RAID; and
    copying data from the at least one drive of the RAID to a replacement drive when the number of times the drive reliability metric passes the first threshold value passes a second threshold value.

12. A method comprising:
    conducting a predictive fault analysis for at least one drive of a redundant array of independent drives (RAID), wherein the conducting a predictive fault analysis for at least one drive of a redundant array of independent drives (RAID) comprises:
        computing a drive-reliability metric for the at least one drive of the RAID, wherein the computing a drive-reliability metric for the at least one drive of the RAID comprises:
            disregarding at least a portion of the drive-reliability metric according to an 10 channel disturbance independent of the function of the at least one drive of the RAID; and
    copying data from the at least one drive of the RAID to a replacement drive when the number of times the drive reliability metric passes the first threshold value passes a second threshold value.

13. The method of claim 12, wherein the computing a drive-reliability metric for the at least one drive of the RAID comprises:
    computing a time between an input/output (IO) request and a completion of the IO request.

14. The method of claim 12, wherein the computing a drive-reliability metric for the at least one drive of the RAID comprises:
    computing a time between a completion of a first input/output (IO) request and a completion of a second IO request.

15. The method of claim 12, wherein the computing a drive-reliability metric for the at least one drive of the RAID comprises:
    comparing the drive reliability metric to a rate-based threshold value.

16. The method of claim 12, wherein the computing a drive-reliability metric for the at least one drive of the RAID comprises:
    comparing the drive reliability metric to a user-defined threshold value.

17. The method of claim 12, wherein the disregarding at least a portion of the drive-reliability metric according to an IO channel disturbance independent of the function of the at least one drive of the RAID comprises:
    disregarding at least a portion of the drive-reliability metric according to an IO channel disturbance associated with at least one of a channel initialization, a channel communication disruption, or a channel exception that delays completion of an IO request.

18. The method of claim 12, further comprising:
redirecting IO requests addressed to the at least one drive in the RAID to the replacement drive.

19. The method of claim 12, further comprising:
reconstructing data of the at least one drive in the RAID from the replacement drive.

20. The method of claim 12, further comprising:
storing at least one of RAID state data, RAID control data, or RAID configuration data to a non-RAID drive.

21. The method of claim 12, further comprising:
verifying at least one of a read or write operation to the at least one drive of the RAID utilizing redundant RAID data.

\* \* \* \* \*